July 21, 1931.  L. C. JOSEPHS, JR  1,815,437
FRONT DRIVE POWER UNIT
Filed Jan. 17, 1930  2 Sheets-Sheet 1

Inventor:
Lyman C. Josephs, Jr.,
By his Attorneys
Redding, Greeley, O'Shea & Campbell

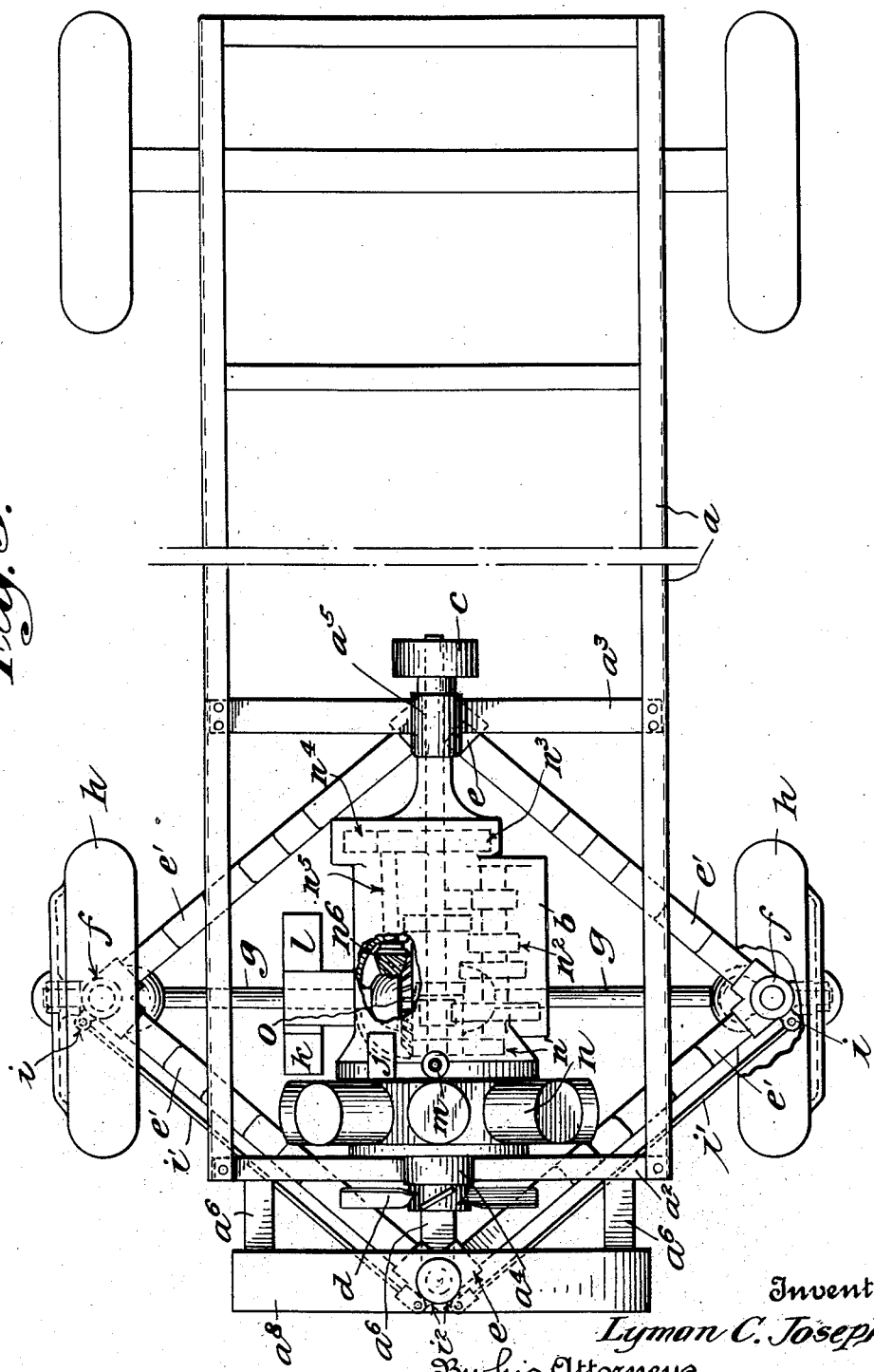

Patented July 21, 1931

1,815,437

UNITED STATES PATENT OFFICE

LYMAN C. JOSEPHS, JR., OF ALLENTOWN, PENNSYLVANIA, ASSIGNOR TO INTERNATIONAL MOTOR COMPANY, OF NEW YORK, N. Y., A CORPORATION OF DELAWARE

FRONT DRIVE POWER UNIT

Application filed January 17, 1930. Serial No. 421,341.

The present invention relates to improved drives for motor vehicles and embodies, more specifically, a vehicle upon which the power unit has been mounted at the front thereof, power being transmitted from the unit to the front steering wheels of the vehicle. More particularly, the present invention embodies an improved form of front drive power unit which is so constructed that the engine and transmission may be mounted within a relatively small space, thus greatly facilitating the construction and servicing thereof.

At the present time, there have been provided several forms of front drive power units for motor vehicles, these power units being the standard motor vehicle power units as heretofore used, such units being turned end for end and utilized to drive the front wheels directly through a suitable differential mechanism. While these constructions have been found highly advantageous in certain respects, obvious disadvantages have existed by reason of the difficulty of mounting all of the parts within a well defined and restricted space in order that the length of the power unit will not consume too great a proportion of the wheel base of the vehicle.

Accordingly, it is an object of the present invention to provide an improved power unit for motor vehicles, such power unit being so constructed that considerable space is saved over existing designs.

A further object of the invention is to provide a power unit of the above character which is so constructed as to afford an improved drive to the front wheels of a motor vehicle.

A further object of the invention is to provide a spring suspension for the front wheels of a motor vehicle, such suspension not only affording a short turning radius but also materially improving the steering qualities of the vehicle.

A further object of the invention is to provide a suspension of the above character by means of which center point steering is effected.

A further object of the invention is to provide a spring suspension of the above character in which the steering and brake connections to the knuckle are considerably simplified and readily mounted and serviced.

Further objects, not specifically enumerated above, will be apparent as the invention is described in greater detail in connection with the accompanying drawings, wherein:

Figure 3 is a plan view, partly broken away and in section, showing the power unit of Figure 1.

Figure 1:
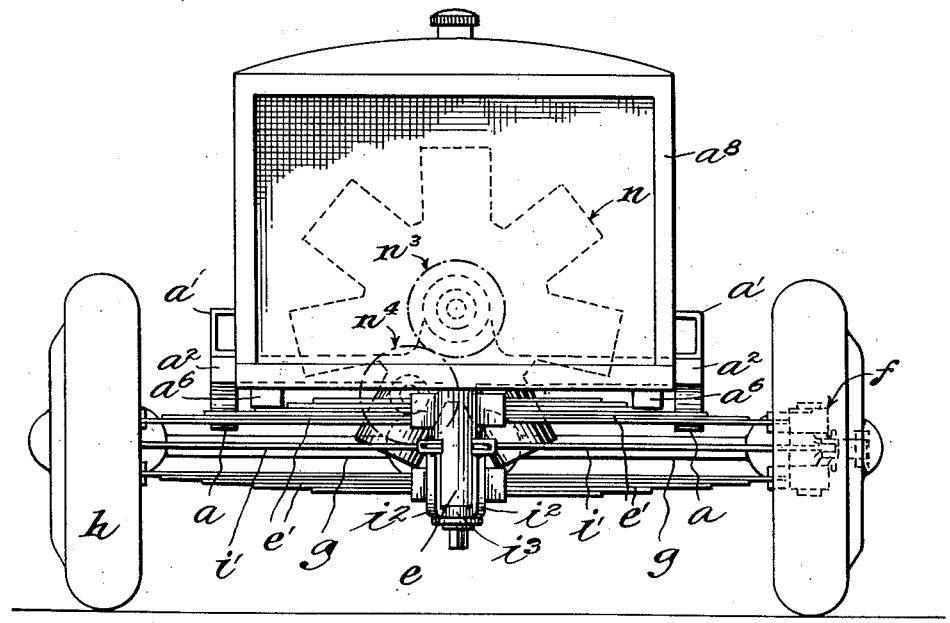
Figure 1 is a view in front elevation showing a vehicle provided with a power unit and spring suspension constructed in accordance with the present invention.
Figure 2:
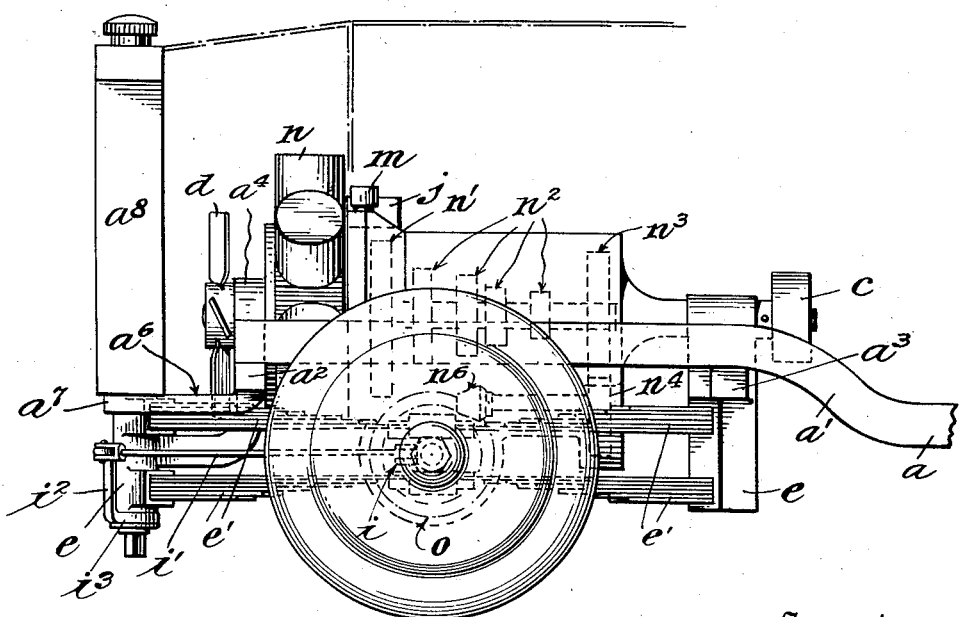
Figure 2 is a view in side elevation showing the power unit and suspension of Figure 1.

Referring to the above drawings, $a$ designates the vehicle frame which may be formed with a kick up at $a'$. This kick up receives the front axle and associated driving units and preserves a desirable over all height for the passenger carrying portion of the frame.

Cross frame members $a^2$ and $a^3$ are provided at the forward end of the frame and mount a driving unit $b$ which is self-contained and adapted to drive the forward wheels of the vehicle. Suitable trunnions $a^4$ and $a^5$ are provided in the respective cross frame members $a^2$ and $a^3$ and receive cooperating bearing portions of the power unit $b$. An engine driven rotating element $c$ is provided rearwardly of the trunnion $a^5$ to afford a means for providing an emergency brake for the vehicle while an engine driven fan $d$ is mounted forwardly of the trunnion $a^4$. The power unit is preferably rigidly mounted within the trunnion $a^5$ at the rear, while the forward trunnion $a^4$ receives the driving shaft for the fan $d$.

Forwardly extending arms $a^6$ mount a radiator support $a^7$ upon which a radiator $a^8$ is mounted. Extending downwardly from the cross frame member $a^3$ and the radiator support $a^7$ are brackets $e$ within which quarter elliptic springs $e'$ are secured at their heavy ends. It is preferred that these springs be used in pairs, the heavy ends of each pair being mounted in the respective brackets $e$ and extending outwardly therefrom in a diamond shaped pattern, as clearly shown in Figure 3. The outer ends of springs $e'$ are pivoted to the knuckle housings $f$, the springs being so mounted that the upper and lower spring sections form a vertical parallelogram.

Knuckle housings $f$ carry the usual knuckles and mount an axle $g$ with which are associated wheels $h$. It will be readily seen that, by means of this spring design, the knuckle may be mounted in the central planes of the wheels, thus providing center point steering in addition to affording a relatively small turning radius by reason of the fact that the spring sections do not obstruct a very considerable turning of the wheels.

Steering may be effected through suitable levers $i$ mounted upon the respective knuckles and connected to drag links $i'$ which are pivoted to the respective arms $i^2$ of a steering member $i^3$. This member may be operated by any suitable means from a steering wheel conveniently located. This steering thus utilizes a double drag link, each being kept parallel with the vertical parallelogram of springs. In a similar fashion connections for front wheel brakes are provided, these connections not being shown in the interest of clearness.

The foregoing construction lends itself to a convenient location of the starting motor which is shown at $j$, as well as the generator and air compressor shown respectively at $k$ and $l$. The distributor is shown as positioned at $m$ and thus a very convenient and accessible mounting for the foregoing accessories is provided, greatly facilitating the servicing of such parts and insuring proper maintenance thereof.

The engine $n$ is of the seven cylinder radial type. The engine block is rotatable with respect to the housing $b$, thus enabling the blocks to be rotated to any desired position to facilitate servicing thereof. A clutch $n'$ is driven by the engine, transmission $n^2$ being driven from the clutch $n'$ as indicated in dotted lines in Figure 3. Cooperating gears $n^3$ and $n^4$ transmit the drive to a shaft $n^5$, mounted within the housing $b$. This shaft is provided with a hypoid pinion $n^6$ for driving differential mechanism $o$, the drive being transmitted to the wheels in a well known manner.

From the foregoing, it will be seen that a very short power unit is provided, thus saving considerable space on the chassis. All of the parts are mounted in a convenient manner, thus greatly facilitating proper servicing and maintenance thereof, the rotatable engine blocks affording a particularly advantageous unit from the standpoint of maintenance. The entire power unit can be run out under the bus without difficulty while the diamond layout of spring enables much longer springs to be used than in either a longitudinal or transverse arrangement. Furthermore, the above spring design prevents any torsional stresses being set up in the springs, such as is common in transverse spring suspensions. Furthermore, the foregoing spring suspension enables a wide tire tread to be used, at the same time maintaining a large turning angle of the wheels without interference of the springs, such as is common in longitudinal spring designs.

The foregoing construction further provides center point steering since the knuckle housing and knuckle pin are mounted within the wheel as clearly shown in Figure 3.

A further advantage will be seen in the above construction since the brake and steering connections may be maintained entirely separate and distinct, each being directed to the wheels through a separate route, thus eliminating any interference therebetween.

The well known advantages of the front drive power unit are thus combined with an improved power unit which can be quickly removed from the bus in its entirety. It will furthermore be seen that by means of the foregoing construction, there need be no actual chassis frame since the body and frame can be built as a unit if desired.

Further advantages and changes in construction and design of the component parts of the foregoing invention will be apparent and the scope thereof is not to be limited, save as defined in the appended claims.

I claim as my invention:

1. In combination with a vehicle frame, an engine, a transmission rearwardly of the engine and driven thereby, a driving axle on the frame, a plurality of springs disposed generally in the shape of a diamond mounted upon the frame at ends thereof at opposite corners of the diamond and mounting the axle at the other ends thereof, means to mount the engine and transmission as a unit within the diamond over the axle, a forwardly extending shaft driven from the transmission at the rear thereof, and means to drive the axle from the last named shaft.

2. In combination with a vehicle frame, a plurality of wheels, springs mounted upon the frame and diverging forwardly, common supporting means on the frame to mount the springs, springs mounted upon the frame and diverging rearwardly to meet the first springs, common means on the frame for supporting the springs, means to mount the wheels upon the meeting ends, a lever pivoted to one of the supporting means, and means connecting the lever with the wheels to steer the same.

3. In combination with a vehicle frame, a plurality of wheels, springs mounted upon the frame and diverging forwardly, common supporting means on the frame to mount the springs, springs mounted upon the frame and diverging rearwardly to meet the first springs, common means on the frame for supporting the springs, and means to mount the wheels upon the meeting ends.

This specification signed this seventh day of January, A. D. 1930.

LYMAN C. JOSEPHS, Jr.